US009682860B2

(12) United States Patent
Maroun et al.

(10) Patent No.: US 9,682,860 B2
(45) Date of Patent: Jun. 20, 2017

(54) PROCESSES AND APPARATUSES FOR RECLAMATION AND PURIFICATION OF TRITIUM

(71) Applicant: PerkinElmer Health Sciences, Inc., Waltham, MA (US)

(72) Inventors: Joseph Maroun, Walpole, MA (US); Steven T. Schaeffer, Duxbury, MA (US); William D. MacIntosh, III, Nashua, NH (US); Anthony F. De Louise, III, Boston, MA (US)

(73) Assignee: PerkinElmer Health Sciences, Inc., Waltham, MA (US)

( * ) Notice: Subject to any disclaimer, the term of this patent is extended or adjusted under 35 U.S.C. 154(b) by 14 days.

(21) Appl. No.: 14/805,777

(22) Filed: Jul. 22, 2015

(65) Prior Publication Data

US 2017/0022059 A1 Jan. 26, 2017

(51) Int. Cl.
 *C01B 4/00* (2006.01)

(52) U.S. Cl.
 CPC ................ *C01B 4/00* (2013.01)

(58) Field of Classification Search
 CPC .................................... C01B 4/00
 See application file for complete search history.

(56) References Cited

U.S. PATENT DOCUMENTS

| 3,682,598 A * | 8/1972 | Kaartinen | G01N 1/44 250/303 |
| 9,266,750 B2 * | 2/2016 | Wilson | G21F 9/06 |
| 2007/0246344 A1 * | 10/2007 | Bonnett | B01D 59/04 203/5 |
| 2016/0233001 A1 * | 8/2016 | Koyanaka | B01J 20/06 |

FOREIGN PATENT DOCUMENTS

WO WO 2009/156997 * 12/2009

* cited by examiner

*Primary Examiner* — Melvin C Mayes
*Assistant Examiner* — Kenneth Vaden
(74) *Attorney, Agent, or Firm* — Dinsmore & Shohl LLP (57) ABSTRACT

Provided are processes and systems for the reclamation of tritium from a tritiated byproduct material. A liquid organic tritium containing material is subjected to a series of reactions to isolate purified tritium gas that can be used in subsequent tritiation reactions. The processes involve in some aspects a semi-automated system that subjects a byproduct liquid organic tritium containing material to an oxidation to produce tritiated water, a chemical splitting of the tritiated water to form a tritiated gas that is substantially free of oxygen or other contaminants, and the isolation of purified tritium gas from hydrogen containing HT gas. The processes and systems provided substantially reduce both the cost to produce tritium source material for labeling of organic molecules and the amount of byproduct that requires disposal.

25 Claims, 5 Drawing Sheets

PROCESSES AND APPARATUSES FOR RECLAMATION AND PURIFICATION OF TRITIUM

FIELD OF THE INVENTION

The present disclosure relates to processes and systems for reclamation of desirable chemical components for their subsequent reuse. Specific processes are provided for reclaiming tritium from low specific activity byproducts of tritiation reactions, concentrating and purifying it at high specific activity for later reuse.

BACKGROUND OF THE INVENTION

Tritium ($^3$H or T) is the radioactive isotope of hydrogen and for over fifty years it has been extensively used to radiolabel numerous molecules of interest to biologists. Among its many uses, tritium offers significant advantages as a molecular tag. First, tritium is essentially the same size as hydrogen, and therefore, causes no significant structural change to the radiolabelled molecule of interest. Also, the half life of tritium is a convenient 12.3 years, which allows (if necessary) for long complex multistep syntheses as well as a reasonable shelf life of the tritiated product. Also, over the course of several decades, numerous synthetic methods have been discovered to install it into molecules at high specific activity. Tritium will likely be the isotope of choice to radiolabel many interesting substances for many years to come.

Unfortunately, during the course of using tritium for radiolabelling, there is an almost unavoidable consequence of creating unwanted tritiated byproducts. In many instances, this occurs because tritium gas can catalytically exchange with hydrogen attached to heteroatoms (oxygen, nitrogen, sulfur etc.) and then back exchange with protons during protic solvent work-up of the reaction, creating tritiated byproduct. These tritiated byproducts are often complicated mixtures of diverse chemicals and of too low specific activity to be useful for any radiolabelling reactions. Importantly, this tritiated byproduct is very costly to dispose of and, since many of the byproducts are low boiling solvents, there are also a storage safety concerns and possible contamination risks prior to disposal.

Clearly, complex mixtures of tritiated byproducts entering the environment are a concern. As such, there is an unmet technical need for processes and systems to recycle these low specific activity materials to pure high specific activity tritium gas.

SUMMARY OF THE INVENTION

The following summary is provided to facilitate an understanding of some of the innovative features and is not intended to be a full description. A full appreciation of the various aspects can be gained by taking the entire specification, claims, drawings, and abstract as a whole.

A process is provided to collect the tritiated byproducts in recyclable containers. In a controlled and parameter optimized method, the tritiated organics are completely oxidized in a catalyst oxidation chamber and all of the tritium is converted to tritiated water. The oxidizer flow capacity was designed to be extremely efficient. A process includes: oxidizing a tritium containing organic material for an oxidation time and at an oxidation temperature to produce tritiated water; splitting the tritiated water to a solid oxygen containing species and a tritiated gas species; and trapping the tritiated gas species, optionally as a raw tritiated gas species optionally in the form of a combination of HT (hydrogen-tritium) and TT (tritium$_2$). Optionally, a process also includes evaporating and condensing the tritiated water to produce a purified tritiated water, and subjecting the purified tritiated water to the step of splitting. The step of oxidizing optionally includes contacting the tritium containing organic material with purified oxygen. In the step of oxidizing the oxidation temperature is optionally in excess of 100° C., optionally in excess of 300° C., optionally from 490° to 590° C. The step of oxidizing is optionally in the presence of a catalyst. The step of oxidizing of optionally for an oxidation time of 7-14 hours, optionally 10 hours. In the process, the step of splitting optionally includes contacting the tritiated water (optionally raw or purified) with a splitting material suitable to bind oxygen as a solid by-product. The splitting material optionally includes magnesium and/or phosphorous pentoxide. In some aspects, the step of contacting produces raw tritium gas, and the process further includes trapping the raw tritium gas. The step of trapping optionally includes contacting the tritium gas with charcoal. Optionally, the process includes separating pure tritium from hydrogen in the raw tritium gas. Optionally, the step of separating includes passing the tritium gas through a molecular sieve column and an activated charcoal and $CO_2$ column. The step of separating optionally is by cryogenic gas chromatography. The step of trapping is optionally trapping tritium in uranium.

Also provided is a method to split water into the components of oxygen and hydrogen and/or tritium gas. The present processes are far superior from prior methods of producing labeled or unlabeled water by electrolysis each of which are cumbersome and add unneeded technical complexity. Furthermore, it was critical for later steps in the prior process that the oxygen byproduct be completely captured in a non reactive form. The present processes produce raw or purified tritiated gas in two integrated chemical steps, forming as products tritium gas and solid trapped oxygen species, optionally $Mg_3(PO_4)_2$. A process includes: contacting tritiated liquid water with a splitting material suitable to bind oxygen as a solid by-product; and splitting said tritiated water to a solid oxygen containing species and a tritiated gas species, and trapping the tritiated gas species. The splitting material optionally includes magnesium and phosphorous pentoxide. Optionally, the magnesium is layered below the phosphorous pentoxide such that the magnesium and said phosphorus pentoxide are not substantially intermixed. In some aspects, the ratio of magnesium to tritiated water is 3-2:1. Optionally, the rate of water addition to the splitting material is below the rate that will produce MgOH. In some aspects, the step of splitting is performed at a splitting temperature of 18° C. to 26° C. Optionally, the step of contacting is at an atmospheric pressure of 15 pounds per square inch or less. The step of splitting is optionally actively cooled. In some aspects, the splitting reaction produces a solid oxygen by-product that includes a metal salt or phosphate or sulfate.

Also provided are processes to separate tritium gas at high specific activity from any remaining hydrogen or mixed isotopic species H$^3$H gas.

Finally provided are methods to integrate and control all of the individual processes above in a fully automated manner.

DETAILED DESCRIPTION OF THE INVENTION

The following description of particular aspect(s) is merely exemplary in nature and is in no way intended to limit the scope, its application, or uses, which may, of course vary. The processes and apparatuses/systems are described with relation to the non-limiting definitions and terminology included herein. These definitions and terminology are not designed to function as a limitation on the scope or practice of the processes and apparatuses/systems but are presented for illustrative and descriptive purposes only.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second (or other) element, component, region, layer, or section without departing from the teachings herein.

The terminology used herein is for the purpose of describing particular aspects only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

Unless otherwise defined, all terms (including technical and scientific terms) used herein have the same meaning as commonly understood by one of ordinary skill in the art to which this disclosure belongs. It will be further understood that terms such as those defined in commonly used dictionaries, should be interpreted as having a meaning that is consistent with their meaning in the context of the relevant art and the present disclosure, and will not be interpreted in an idealized or overly formal sense unless expressly so defined herein.

Provided are processes of and systems for isolating tritium, deuterium, or other heavy element from an impure source, optionally a byproduct stream. The processes according to certain aspects are illustratively used to reclaim tritium from the byproducts, products, unused source, or other unwanted or impure tritium source. It is appreciated that while the description is directed to tritium as an exemplary heavy element, the tritium in the description may be substituted for other elements, particularly heavy elements of hydrogen such as deuterium.

In some aspects, a process of reclaiming tritium from a tritium containing byproduct stream is provided, the process optionally including oxidizing a tritium containing organic material for an oxidation time and at an oxidation temperature to produce tritiated water, splitting the tritiated water to a solid oxygen containing species and a tritiated gas species, and trapping the tritiated gas species. The trapped tritiated gas species is suitable for use in the generation of additional tritiated organic materials. The processes as provided address the long unmet need for a rapid, reliable, and efficient method of reclaiming tritium from byproduct materials. The processes result in drastic reductions of tritium in byproduct, reduce disposal costs, increase environmental cleanliness, and reduce the cost of obtaining a tritium source for the production of tritiated materials.

Processes include the liberation of tritium from organic byproduct materials. In some aspects, a byproduct material contains or is a tritium containing organic compound that is in liquid form at atmospheric temperatures and pressures. Any liquid organic tritium containing material may be used. Illustrative examples that are not in any way limiting include methanol, ethanol, tetrahydrofuran, dimethylformamide, and water. The process are optionally performed in a solvent, which can be water or a mixture of water and an organic solvent where the water and/or organic solvent includes or is a tritium containing organic material. The solvent is optionally inert under oxidation conditions. The water can be water alone, or an acid, neutral or slightly basic aqueous solution. Illustrative oxidation solvents are illustrated in U.S. Pat. No. 5,354,919.

A process includes oxidizing a tritium containing organic material. Suitable catalysts for such an oxidation process are used for this aspect, such as oxidation catalysts known in the art. Optionally, oxygen is combined with an evaporated tritium containing organic material or byproduct material in a process oxidizer that includes an oxidation catalyst. Illustrative catalysts include but are not limited to a metal oxide. In some aspects, a catalyst includes palladium, palladium/tin, palladium/germanium, palladium/copper, palladium/tellurium, palladium/tellurium/copper and palladium/tin/copper. A catalyst is optionally deposited onto a support. Illustrative examples of such a support include active charcoals, silica gels, silica-alumina mixtures, alumina, clays, bauxite, magnesia and diatomaceous earth. In some aspects, a catalyst is 5% paladium on alumina.

The step of oxidizing is optionally in the presence of an oxidizing agent. An oxidizing agent is optionally a liquid or gaseous oxidizing agent. Illustrative examples of an oxidizing agent include, but are not limited to hydrogen peroxide, peracetic acid, tert-butyl hydroperoxide, cyclohexyl hydroperoxide, air, purified oxygen, or other suitable oxidizing agent. Optionally, an oxidizing agent is pure oxygen or oxygen diluted with an inert gas, e.g., nitrogen or a rare gas, optionally argon. The amount of oxidizing agent can either be in excess or deficiency in respect of the stoichiometry of the reactant(s) to be oxidized.

An oxidizing step is performed at an oxidation pressure. An oxidation pressure is optionally atmospheric pressure to 200 bar. In some aspects, an oxidation pressure is from 1 to 100 bar, optionally from 1 to 10 bar. In some aspects, the oxidation step is performed at less than atmospheric pressure permitting oxidizing agent to flow through the reaction medium at a flow rate of, for example, 1 to 200 liters/hour.

An oxidizing step is performed at an oxidation temperature. An oxidizing temperature is the temperature at which the reaction between oxygen provided by an oxidation agent is in contact with a tritium containing organic material and a catalyst. An oxidation temperature is optionally 100° C. or greater. Optionally an oxidation temperature is 300° C. or greater. Optionally, an oxidation temperature is 300° C. to 500° C. Optionally, an oxidation temperature is 300° C. to 600° C. Optionally, an oxidation temperature is 490° C. to 590° C.

In some aspects, a tritium containing organic material is subjected to a variable temperature over time. Optionally, a tritium containing organic material is subjected to a first temperature to evaporate one or more tritium containing organic materials in a sample. Optionally, a tritium containing organic material is subjected to a second temperature to evaporate one or more tritium containing organic materials in the sample with a higher boiling point than a first tritium containing organic material(s). Optionally, a tritium containing organic material is subjected to a third temperature to evaporate one or more tritium containing organic materials in the sample with a higher boiling point than a first and a second tritium containing organic material(s). As such, in some aspects, a sample containing one or more types of tritium containing organic materials are subjected to a continuous or step-wise increase in sample temperature to selectively evaporate certain materials. In some aspects, a first temperature is held for a first evaporation time. A first evaporation time is sufficient to evaporate a first tritium containing organic material(s) and allow that material to move into a process oxidizer and be oxidized. A first evaporation time is optionally from 1-6 hours, optionally 1-3, hours, optionally two hours. A first evaporation temperature is optionally from 40° C. to 65° C. or any value or range therebetween, optionally 50° C. A second evaporation time is sufficient to evaporate a second tritium containing organic material(s) and allow that material to move into a process oxidizer and be oxidized. A second evaporation time is optionally from 5-10 hours or any value or range therebetween, optionally 6-9 hours, optionally 7 hours. A second evaporation temperature is optionally from 65° C. to 80° C., or any value or range therebetween, optionally 75° C. A third evaporation time is sufficient to evaporate a third tritium containing organic material(s) and allow that material to move into a process oxidizer and be oxidized. A third evaporation time is optionally from 1-7 hours or any value or range therebetween, optionally 1-4 hours, optionally 3 hours. A second evaporation temperature is optionally from 80° C. to 99.9° C., or any value or range therebetween, optionally 85° C. It is appreciated that a fourth, fifth, sixth, or additional evaporation time at higher temperatures may be used in the processes. Evaporation temperature and time are dependent on the sample and complexity of the tritium containing organic material and are readily adjusted by one of ordinary skill in the art.

An oxidation time is optionally 1 to 48 hours or any value or range therebetween. An oxidation time is optionally from 5-15 hours, optionally 8-12 hours. An oxidation time is dependent on the amount and complexity of tritium containing organic material present in a sample with simple single material containing samples requiring less time than more complex samples that optionally include step wise or continuous increases in temperature over time.

An oxidizing step produces tritiated water in liquid or vapor form. A process optionally includes condensing tritiated water in a vapor to a liquid in a condenser and storing in a high efficiency or other water trap.

In some aspects, a sample of tritium containing organic material includes tritiated water that may be trapped on a sample collection container such as a dessicant, optionally DRIERITE. When such a sample is present, an optional liberating step is employed to move the material into liquid water form for subsequent processing. A liberating step optionally includes evaporating the tritium containing organic material and condensing it to produce tritiated water. Optionally, a sample of tritium containing organic material on a dessicant is subjected to an evaporation temperature, optionally approximately 250° C., to fully evaporate all tritium containing organic material from the dessicant. The material is condensed by subjecting to low temperature and collected as tritiated water, and optionally processed through the process oxidizer as per the oxidizing step.

A process of reclaiming tritium optionally includes a step of splitting the tritiated water collected from the oxidation step, the liberation step, or both, and trapping the tritiated gas species liberated from the splitting reaction. The tritiated water is split to a solid oxygen containing species and a tritiated gas species. The step of splitting employs a unique mechanism that selectively liberates hydrogen, deuterium, tritium, or combinations thereof from water without producing significant gaseous oxygen or other unwanted byproducts.

A splitting step includes combining tritiated water, optionally, the tritiated water obtained at the step of oxidizing, and combining the tritiated water with one or more splitting materials suitable to bind oxygen as a solid by-product. Illustrative examples of splitting materials include phosphorous pentoxide and optionally magnesium. The amount of magnesium to tritiated water is optionally 3-2:1, optionally 2:1, respectively. The amount of phosphorous pentoxide to tritiated water is optionally 1-3:3, optionally 2:3, respectively. The layering of the splitting materials in the reaction flask are important to safely and completely forcing the reaction to completion.

As a non-limiting example, in the case where the splitting materials are or include phosphorous pentoxide and magnesium, reaction with water tends to produce MgOH. The production of MgOH will greatly reduce the overall yield of gaseous tritium as some of the H will be tritium and the MgOH will act as a poison to the overall reaction. As such, the reaction flask may be layered with the magnesium layered in the flask first so as to be positioned at a location most distal to the area of the flask into which the tritiated water is added. On top (i.e. more proximal to the entry point of the tritiated water) of the magnesium is layered the phosphorous pentoxide. The tritiated water is added to the reaction flask last in such a way so as to contact the phosphorous pentoxide first and allow the reaction to come to completion before any reactant is able to reach the magnesium layer.

Splitting is performed at a splitting temperature, a splitting pressure, and a splitting time. A splitting pressure is optionally 0.1 to 10 psi, or any value or range therebetween. A splitting pressure is optionally 0.7 to 10 psi. A splitting temperature is optionally any temperature at which water is a liquid, optionally 10° C. to 99° C., or any value or range therebetween. Optionally, a splitting temperature is 18° C. to 25° C., optionally 24° C. to 26° C., optionally 25° C. A splitting time may be any time suitable to allow the reaction to go to completion for the amount of reactants present in the reaction chamber. In some aspects, tritiated water is flowed into the reaction chamber at a flow rate such that all the water is not added in a single addition. The flow rate of the tritiated water addition is dependent on the amount of splitting material(s) present in the flask and directed not to be over the rate that will allow the reaction to go to completion without formation of metal hydroxide, optionally MgOH.

The amount of tritiated water relative to splitting materials is optionally 2:1 magnesium to water. Optionally the amount of tritiated water to phosphorous pentoxide is 2:3. The overall splitting reaction with water produces solid metal salt with phosphate or sulfate, optionally $Mg_3(PO_4)_2$ and a raw tritium containing gas that is either in the form of TH, TT, or combinations thereof.

The raw tritium containing gas is optionally trapped for subsequent use, isolation, or storage. In some aspects, tritium gas is reversibly trapped in a storage medium, optionally activated charcoal. The activated charcoal is optionally cooled to a temperature at which it will trap hydrogen. Upon rewarming or heating, the activated charcoal will release the trapped tritium/hydrogen gas for subsequent processing or isolation. In some aspects, the storage medium is used at a volume of 1 liter for effective trapping of tritium/hydrogen from 2 moles of tritiated water. Raw tritium gas is optionally transferred to a storage medium by movement along a conduit driven by pressure differential. The reaction of the tritiated water with the splitting material(s) causes an increase in pressure in a contained system. Release of the pressure toward a storage medium is optionally used to trap tritium gas in a region separated from the splitting reaction and helps drive the splitting reaction to completion for the amount of splitting material.

The tritium gas is optionally subjected to an isolating step to isolate TT gas from HT gas. A step of isolating includes subjecting the tritium gas to separation through a plurality of gas chromatographic separation steps to isolate TT from HT present in the raw tritium gas. In some aspects, a tritium gas contained on activated charcoal is subjected to an elution whereby the raw tritium gas is subjected to a first separation step using a molecular sieve. Molecular sieves are synthetic materials commonly prepared from sodium or calcium aluminum silicates and are commercially available in beads having pore sizes in the range of 3 to 10 angstroms. The pores in each bead form a network of interconnecting tunnels so that small molecules entering the pores may pass through the network more readily than larger molecules. Thus, a separation of molecular species is accomplished by a sieving effect whereby smaller molecules pass through the sieves faster than larger molecules. Elution is usually in order of increasing molecular size. The separation of hydrogen isotopes on molecular sieves is known and may be achieved illustratively by the methods of S. Akthar and H. A. Smith, *Chem. Rev.*, 64, 261-76 (1964); and M. L. Conti and M. Lesimple, *J. Chromatog.*, 19, pp. 32-43 (1967), and U.S. Pat. No. 4,732,581. A tritium gas eluted from a storage medium is combined with an inert carrier gas, illustratively helium or neon, and subjected to cooling in a sample loop. The sample loop is optionally cooled by immersion in liquid hydrogen such that it cools the raw tritium gas to a separation temperature of −180° C. The carrier gas is flowed into the sample loop at a rate of 30 ml/min.

The output of the sample loop is fed into a first molecular sieve column at a flow rate that varies between 0.3 L/min and 20 L/min for initial separation of HT and TT with the lighter HT eluting first. A first molecular sieve column includes a molecular sieve material. A molecular sieve material is optionally formed from alumina, silicon dioxide, or other materials known in the art as suitable for hydrogen isotope separation. Elution peaks are detected by passing the eluent through a rad detector (ionization gauge).

The eluent is the subjected to peak cutting by passing the eluted material through a main column. The main column is optionally a column of activated charcoal and a blocking agent suitable to deactivate the activated charcoal, optionally $CO_2$. The main column is optionally cooled by immersion in liquid nitrogen to equilibrium to densify the output. The lighter tritiated material (HT) gas is eluted first and optionally adsorbed on a metal trap that is formed from any suitable metal hydride. The purified tritium gas, TT, is adsorbed to a separate metal trap. The purified TT is then available for any desirable use including but not limited to reuse in the production of any tritium containing material.

The above processes effectively reclaim purified tritium gas from a byproduct stream in a process that is highly efficient, results in greater than 96% yields, and results in a material that is suitable for use in the further production of virtually any tritium containing material.

Figure 1:
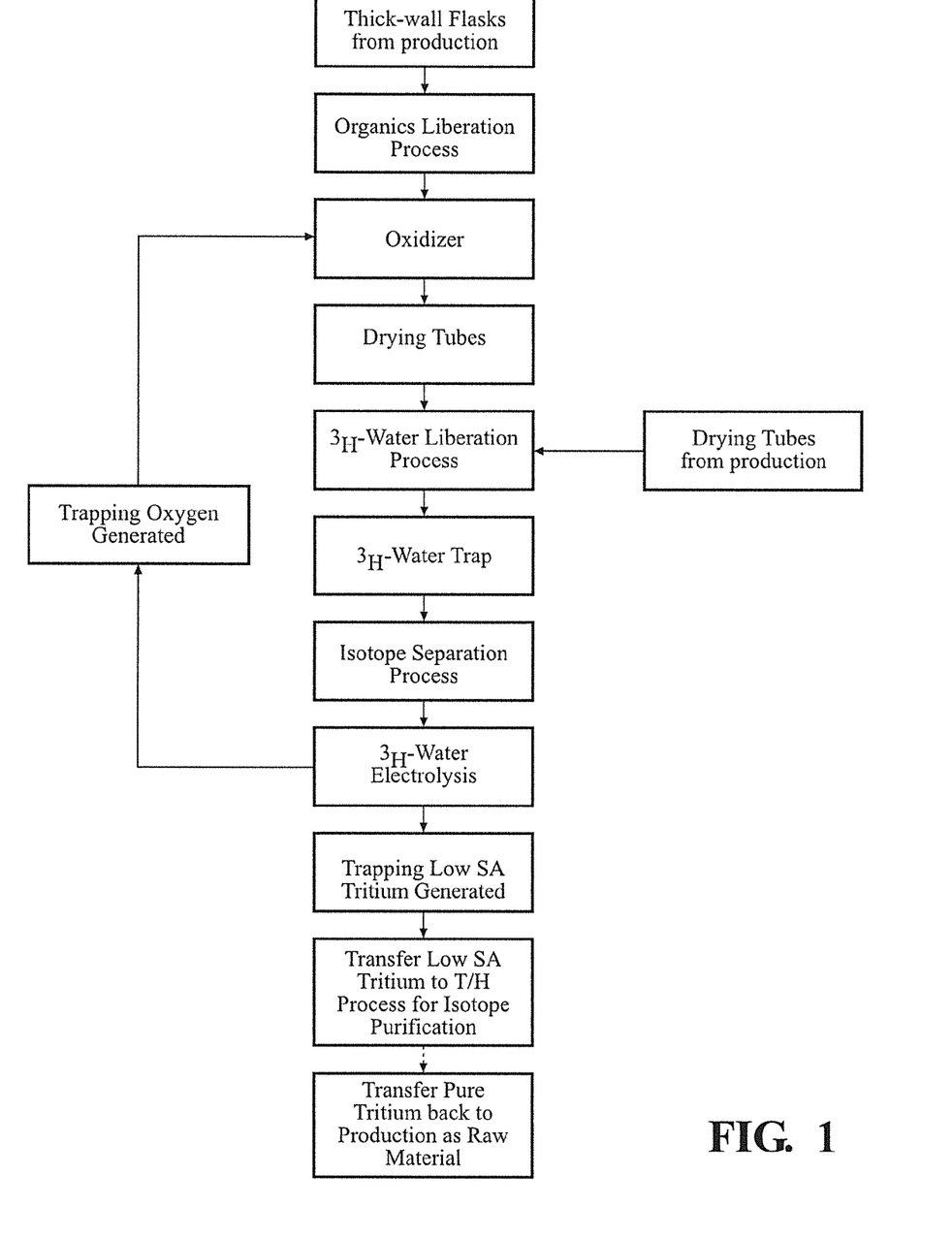
FIG. 1 is an exemplary schematic of a process of reclaiming tritium from a tritium containing byproduct stream according to one aspect.
Figure 2:
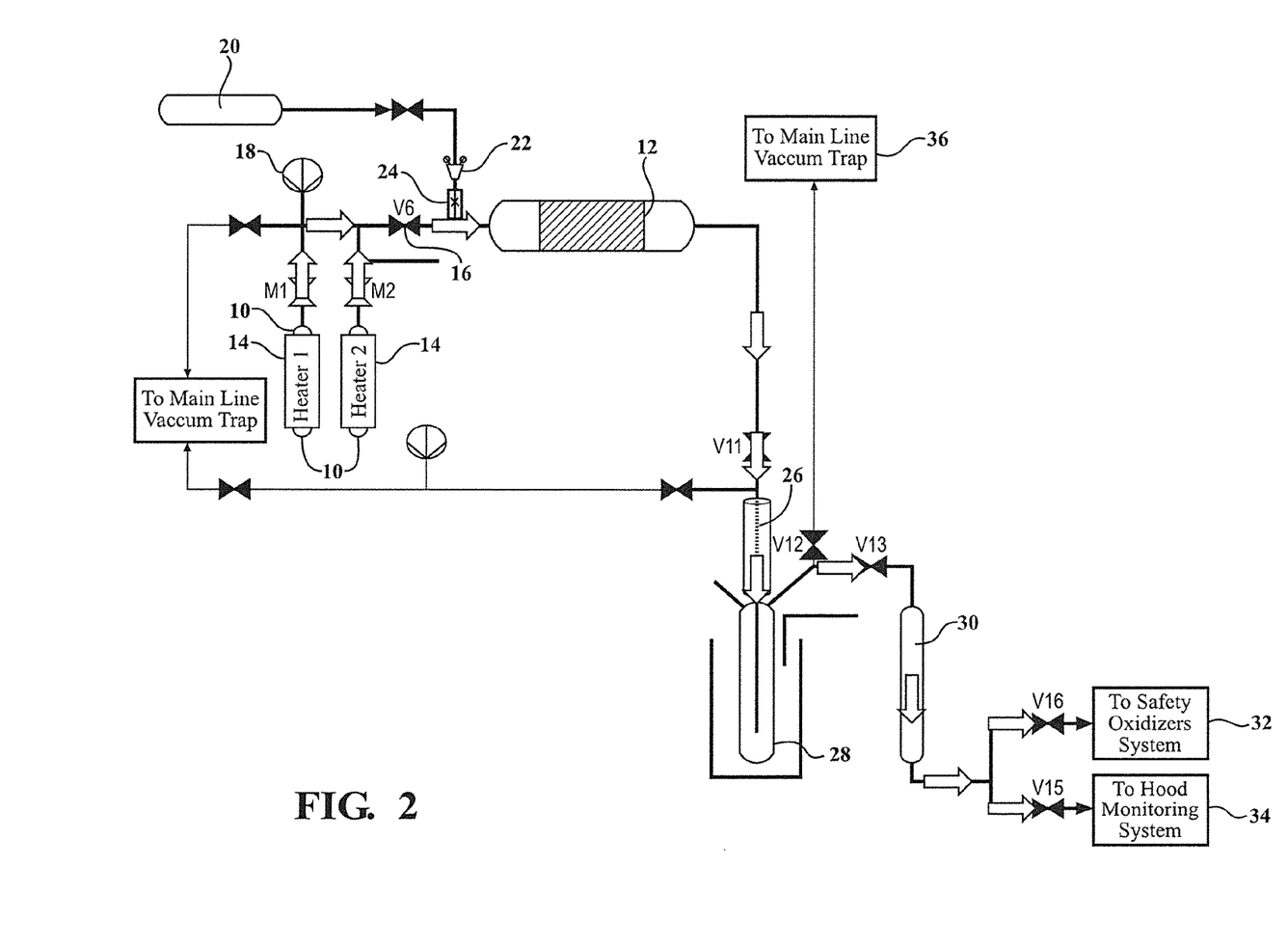
FIG. 2 illustrates a system for liberation of tritium focusing on an oxidation subsystem according to one aspect where ▶◀ and ⋈ represent valves.

Also provided are systems suitable for the reclaiming tritium from a tritium containing byproduct stream. A system optionally functions to perform the processes described or claimed herein. Such systems are optionally fully or partially automated allowing for efficient production of purified tritium gas from a tritium containing organic material. In accord with one exemplary aspect, a system includes components arranged for oxidation of a tritium containing organic material substantially as illustrated in FIG. 2 illustrating an exemplary oxidation subsystem. An oxidation subsystem includes one or more sample containers 10 that are configured to contain one or more tritium containing organic materials in fluidic contact with a process oxidizer 12. A process oxidizer is optionally a suitable to oxidize as much as 99.999% of the tritium containing organic materials. A process oxidizer optionally is formed of a plurality of oxidation chambers. A first oxidation chamber is optionally at a first oxidation temperature and a second oxidation chamber is optionally at a second oxidation temperature. A first oxidation temperature is optionally lower than or equal to the temperature in a second oxidation chamber. Optionally, a first oxidation chamber is at a temperature of 490° C. and a second oxidation chamber is optionally at a temperature of 590° C. A first oxidation chamber is optionally made of a material including copper oxide and a second oxidation chamber is optionally made of a material including platinum, palladium, or combinations thereof.

A sample container 10 may be made from any suitable material non-reactive with the tritium containing organic material, where such non-reactive materials illustratively include stainless steel, glass, or other suitable material. The sample containers 10 are placed in proximity or within a heater 14 that will adjust the temperature of the tritium containing organic materials to a temperature suitable to evaporate the tritium containing material. The sample containers 10 are connected via a conduit to the process oxidizer 12. A conduit may be made from non-reactive material, illustratively stainless steel, glass, polymeric materials, among others. A conduit, optionally formed of a non-reactive metal, optionally stainless steel, is connected to each sample container and optionally includes a Swagelok valve 16 operable to control the passage of fluid from the sample container 10 to the process oxidizer 12. A pressure gauge 18 is optionally connected to a conduit upstream of the process oxidizer 12 to monitor the pressure of the fluid in the conduit.

As used herein, a fluid is optionally any movable material, illustratively gas or liquid. In many aspects, a fluid is gaseous.

An oxidation gas source 20 is in fluidic contact with the conduit to allow an oxidizing agent, optionally purified oxygen, to contact the tritium containing organic material upstream or within a process oxidizer 12. The flow of the oxidizing agent is regulated by a pressure regulator 22 and the rate of flow and pressure of the oxidizing agent is optionally controlled by a flow control valve 24.

The output of the process oxidizer 12 is transferred through a conduit and passed through a condenser 26 that is cooled to force the tritiated water formed in the process oxidizer 12 to condense into a liquid that is collected into a water trap 28 that is cooled in dry ice. The non-condensable gaseous material flows through a drying tube through a cleaning or monitoring system, optionally formed of a drying tube, optionally a DRIRITE tube or other desiccant containing tube, that optionally includes a valve to regulate the on/off state of the cleaning an monitoring system, to capture any residual tritiated water and prevent environmental release. Optionally, the non-condensable gaseous material flows through a cleaning tube 30 that is optionally formed of a tritium containing binding material, optionally activated carbon, and optionally a downstream safety oxidizer 32 and hood monitoring system 34. A valve is optionally upstream of the safety oxidizer 32 and the monitoring system 34 to allow the individual components to be isolated.

Also downstream of the water trap 28 is a vacuum source 36 that is used to initially evacuate the system to promote optimal oxidation pressure, movement of gas through the system and draw waste gas from the water trap. It is appreciated that in many aspects a system is substantially closed so that pressure can be readily regulated throughout and so that release of tritium to the external environment is eliminated or minimized.

Figure 3:
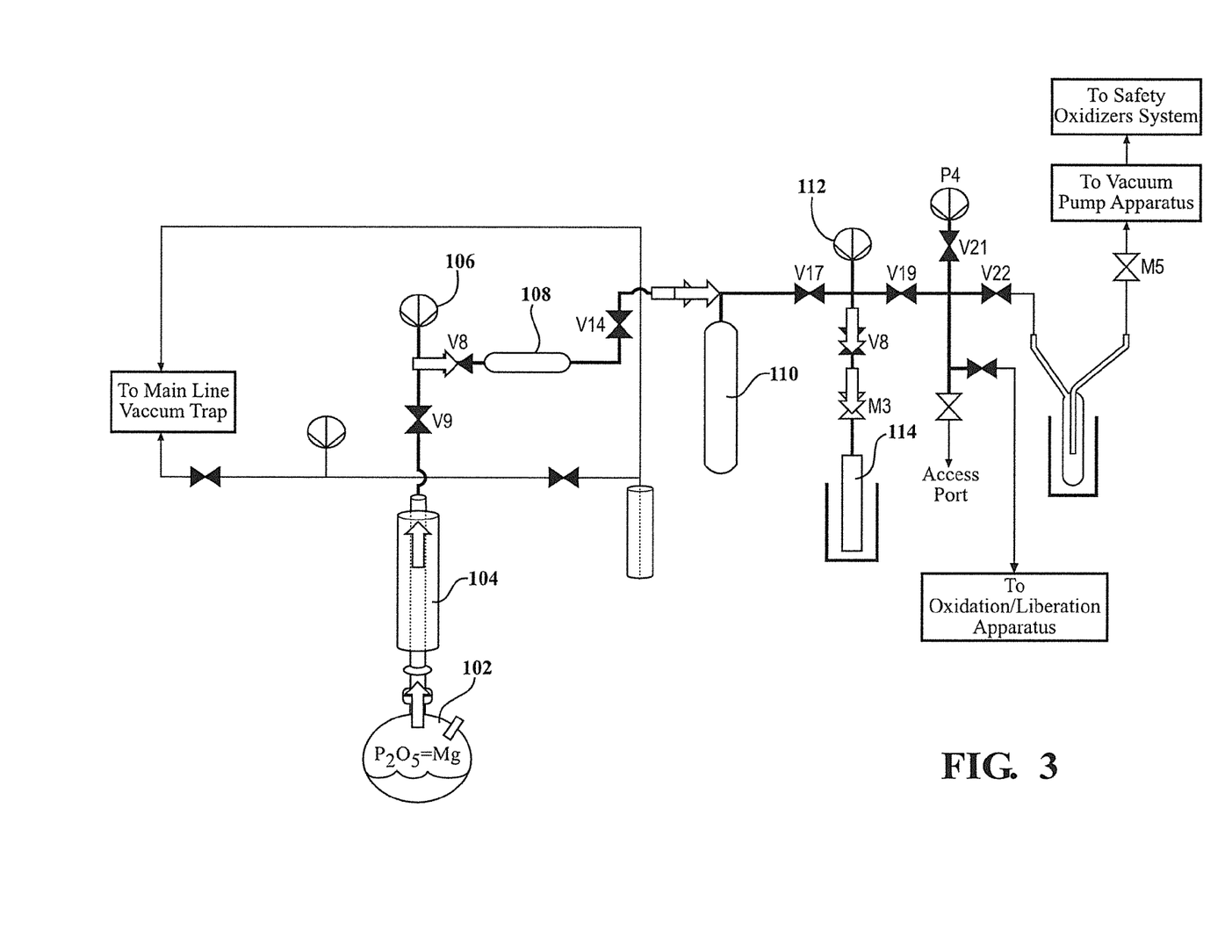
FIG. 3 illustrates a partial system for liberation of tritium focusing on a water splitting subsystem according to one aspect where ▶◀ and ⋈ represent valves.

A system optionally includes a tritiated water splitting subsystem ($T_2O$ subsystem). An illustrative $T_2O$ subsystem according to one aspect is depicted at FIG. 3. The $T_2O$ subsystem includes a splitting reaction vessel 102 that is in fluidic contact to a conduit. The splitting reaction vessel is any vessel capable of housing tritiated water and one or more splitting materials, illustratively an acid flask. A splitting reaction vessel optionally includes a valve through which tritiated water, optionally from the oxidation step, is injected to combine with the splitting material. The output conduit, whereby the gaseous tritium in the form of TT or HT, optionally passes, optionally moves through a condenser 104 that prevents any gaseous water from escaping to thereby be returned to the reaction vessel. The conduit optionally passes through valve and as pressure monitored by a pressure gauge 106. Downstream of the pressure gauge 106 is a valve that is used to open and close the gas produced in the reaction vessel to the remainder of the $T_2O$ subsystem. The $T_2O$ subsystem as depicted in FIG. 3 further includes a desiccant column 108, optionally calcium sulfate, through which the gas material passes to remove any residual water from the line. The conduit downstream of the desiccant column 108 includes a valve and a pressure overflow container 110 that houses the gaseous tritium until a certain pressure is reached. A valve is positioned downstream of the overflow container 110 downstream of which is another pressure gauge 112. The conduit splits with one line in fluidic contact with a gaseous tritium storage tank 114 that traps the gaseous tritium for subsequent processing. The gaseous tritium storage tank 114 is optionally housed in a cooling flask such as a standard Dewar flask.

A $T_2O$ subsystem optionally further includes a safety system whereby the conduit upstream of the storage tank 114 is further connected via a valve to a main line trap to sequester any remaining fluid in the system. A vacuum apparatus and safety oxidizer are optionally also positioned downstream of the main line trap to sequester any tritium material not trapped on the storage tank 114.

Figure 5:
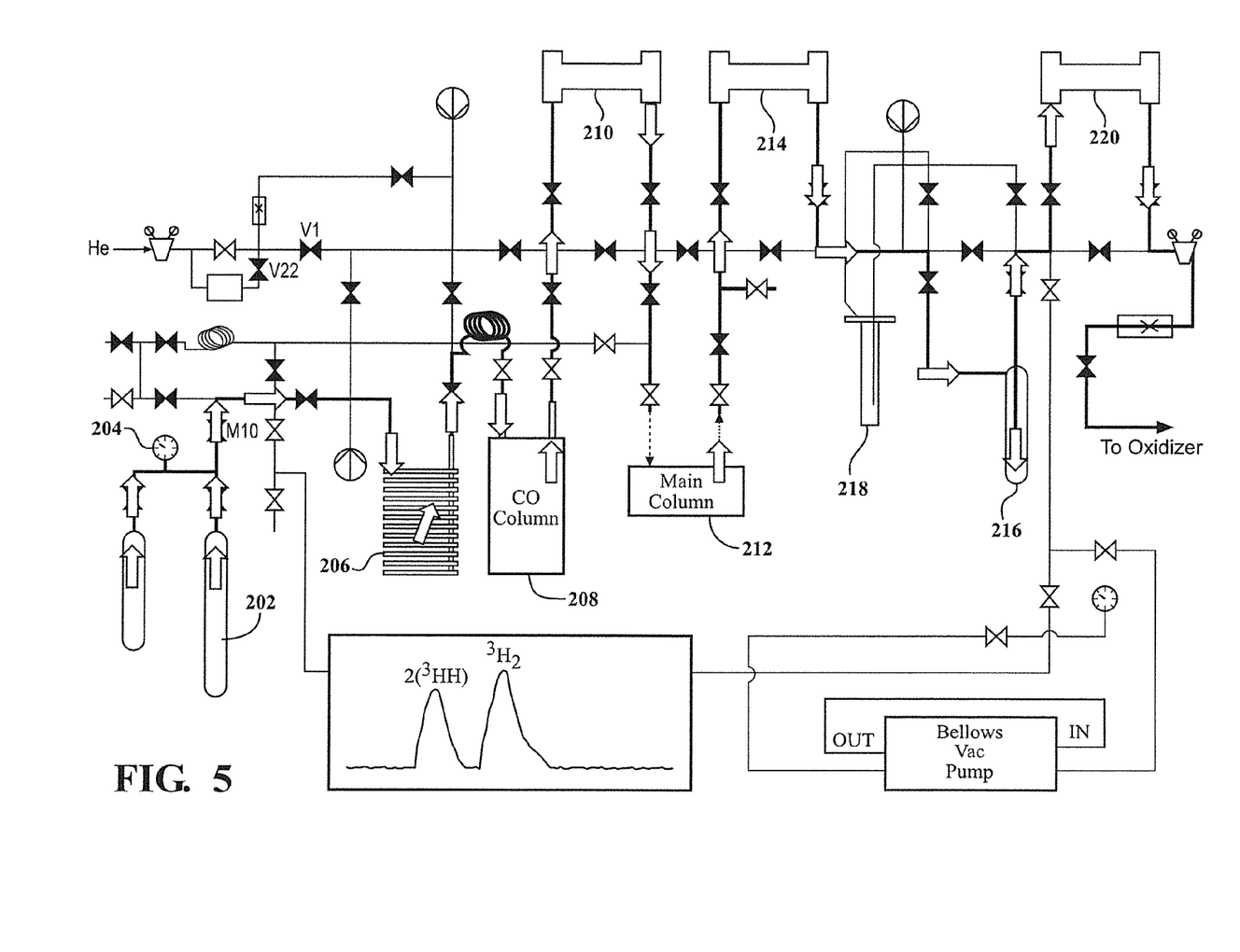
FIG. 5 illustrates a partial system for liberation of tritium focusing on $T_2$ isolation according to one aspect where ▶◀ and ⋈ represent valves.

A system optionally includes an isotope separation subsystem. An isotope separation subsystem is used to isolate purified tritium ($T_2$) from mixed or pure hydrogen (HT or $H_2$). An isotope separation subsystem according to one aspect is illustrated in FIG. 5 and initiates at one or more conduits that are connected to a gaseous tritium storage tank(s) 202 (optionally corresponding to 114 in FIG. 3). A pressure gauge 204 is optionally positioned on the conduit downstream of the storage tank 202. The gaseous tritium is combined with an inert carrier gas and then transferred through the conduit, optionally passing through a plurality of valves, and into a sample loop 206 whereby the gaseous tritium is cooled. An output conduit from the sample loop 206 transfers the tritiated gas into a molecular sieve column 208. Downstream of the molecular sieve column 208 the eluate passes through a conduit to an optional first detector 210 to determine the identity of the particular eluate at the particular time of elution from the molecular sieve column 208. The conduit optionally includes a divider whereby the eluate optionally bypasses detector 210 and is transferred directly into a main column 212 to further separate out the lighter HT gas from the heavier $T_2$ gas. The eluate from the main column 212 is optionally passed through a second detector 214. As with the first detector 212, the inclusion of the second detector is optional. A conduit optionally includes a divider to allow the eluate to bypass any detector, when present. A conduit from one or more detectors is connected to a plurality of uranium traps 216, 218 that are valved to allow temporal connection to the main column 212 to differentially collect the various eluates. A first uranium trap 216 is used to collect the isolated HT. A second uranium trap 218 is used to collect the $T_2$ eluted from the main column 212. Thus, the system will collect isolated $T_2$ for later reuse.

Downstream of the uranium traps optionally is a third detector 220 that is in gaseous contact with the uranium traps to detect the presence of any escaped tritium containing materials. A conduit connected to the third detector 220 optionally includes a pressure regulator and a flow control valve the output of which is connected to a safety oxidizer to remove any residual untrapped tritium material.

The oxidation subsystem, the $T_2O$ subsystem, the optional $T_2O$ liberation subsystem, and the isotope separation subsystem are optionally separated such that the products produced by each subsystem are manually transferred to the next system or are in fluidic connection such that the collected material product from a prior subsystem is directly transferable to the next reaction subsystem. It is further appreciated that the entire process is optionally automated by one or a plurality of connections to a computer particularly configured to carry out the processes and control the various gas sources, material sources, heaters, valves, etc. of an individual subsystem or a plurality of subsystems.

Various aspects of the present processes and apparatuses/systems are illustrated by the following non-limiting examples. The examples are for illustrative purposes and are not a limitation on any practice of the present processes and apparatuses/systems. It will be understood that variations and modifications can be made without departing from the spirit and scope of the processes and apparatuses/systems.

Examples

A system for producing and isolating tritium gas is illustratively depicted in FIGS. 2-5 is connected to a computer system particularly configured to control the various valving, heating, cooling, and other conditions necessary to produce and isolate $T_2$ gas from a source tritium containing organic material. Prior to an oxidation run on the oxidation subsystem as depicted in FIG. 2, glassware in the apparatus is inspected for any visible cracks. Also, both the hood airflow and water scrubber system are inspected for proper operation. The hood air monitoring system for tritium (Overhoff) is also checked to make sure it is properly functioning. Two 50 mL $^3$H organic byproduct containing cylinders are attached to the apparatus as indicated in FIG. 2. The process oxidizer 12 is then turned on and allowed to come to a temperature of between 490-590° C. The system is evacuated by means of a vacuum pump, and the oxygen valve is turned on allowing oxygen to flow into the process oxidizer 12 at a rate of about 2 liters per minute. The condenser 26 is then turned on with a temperature setting of less than −20° C. The system controls the temperature of the heaters to set temperatures of 50° C., 75° C. and 85° C. respectively to selectively vaporize particular materials from the tritium containing organic byproduct material. The start run button is then activated. On the controller display the "Heater 1" or "Heater 2" buttons now appear and the appropriate selection is made. If Heater 1 is selected, valve M1 is opened and if Heater 2 is selected valve M2 is opened. The heaters are then engaged and the temperature increased from room temperature sufficient to vaporize the organic components. After this time the "run finished" button will appear on the display and it is pushed by the operator. The display will then read "turn off air to Process Oxidizer" and the operator turns off the oxygen valve. All heaters are then turned off and valves V6, V11, V13 and V16 are finally closed.

The above oxidation process is repeated using differing types of tritiated material and different operating conditions with conditions and results as depicted in Table 1:

TABLE 1

|  | RUN # 1 | RUN # 2 | RUN # 3 | RUN # 4 |
| --- | --- | --- | --- | --- |
| Oxidizer temperature | 450° C. | 450° C. | 450° C. | 450° C. |
| Oxidizer gas feed | air | air | air | oxygen |
| Flow of oxidizer gas feed | 2 LPM | 3 LPM | 3 LPM | 2 LPM |
| Cooling line Temperature | 6.5° C. | 6.4° C. | 6.1° C. | 6.4° C. |
| Outlet gas temperature (before drying tube) | 32° C. | 52° C. | 52° C. | 37° C. |
| Solvents processed | ethanol | ethanol | 35% ethanol<br>35% methanol<br>20% water<br>5% THF<br>5% DMF | 35% ethanol<br>35% methanol<br>20% water<br>5% THF<br>5% DMF |
| Solvents volume (ml) | 7.8 | 7.8 | 7.8 | 7.8 |
| Solvents temperature (heater setpoint) | 200° C. | 250° C. | 200° C. for 2 hrs<br>250° C. to end | 250° C. for 2 hr<br>300° C. to end |
| Solvents vapor Temperature (steady state, at flask exit) | 65° C. | 65° C. | 51° C. for 2 hrs<br>61° C. to end | 65° C. for 2 hrs<br>32° C. to end |
| Time to perceived completion (until drying tube color change from blue to pink stopped advancing) | 5 hrs | 3 hrs | 4.5 hrs | 3 hrs |
| Actual run time | Overnight | Overnight | Overnight | 4 hrs |
| Volume of solvents left (after cooling) | 1.1 ml | 1.0 ml | 2.2 ml | 1.4 ml |
| Pressure at oxidizer inlet | 1032 mbar | 1047 mbar | 1059 mbar | 1039 mbar |

|  | RUN # 5 | RUN # 6 | RUN # 7 (Hot) |
| --- | --- | --- | --- |
| Oxidizer temperature | 450° C. | 450° C. | 450° C. |
| Oxidizer gas feed | oxygen | oxygen | oxygen |
| Flow of oxidizer gas feed | 2 LPM | 2 LPM | 0.5 LPM |
| Cooling line Temperature | 6.4° C. | 6.4° C. | 10° C. |
| Outlet gas temperature (before drying tube) | 71° C. for 0.5 hr<br>26° C. for 1 hr<br>34° C. to end | 70-75° C. for 0.5 hr<br>35-50° C. for 2 hr<br>25-35° C. to end | N/A |
| Solvents processed | 35% ethanol<br>35% methanol<br>20% water<br>5% THF<br>5% DMF | 35% ethanol<br>35% methanol<br>20% water<br>5% THF<br>5% DMF | 35% ethanol<br>35% methanol<br>20% water<br>5% THF<br>5% DMF |
| Solvents volume (ml) | 50 | 50 | 50 |
| Solvents temperature (heater setpoint) | 100° C. for 2 hr<br>150° C. for 1 hr<br>200° C. to end | 100° C. for 1.5 hr<br>150° C. for 1 hr<br>200° C. to end | 50° C. for 1 hr<br>75° C. for 5.5 hr<br>85° C. for 1 hr |
| Solvents vapor Temperature (steady state, at flask exit) | ~65° C. for 3 hr<br>~85° C. for 1.5 hr<br>62° C. to end | ~62° C. for 1.5 hr<br>~76° C. for 1 hr<br>80-110° C. to end | ~40° C. for 1 hr<br>~35° C. for 5.5 hr<br>68° C. for 1 hr |
| Time to perceived completion (until drying tube color change from blue to pink stopped advancing) | 6 hrs | 7 hrs | 7 hrs |
| Actual run time | Overnight | Overnight | 7.5 hrs |
| Volume of solvents left (after cooling) | 1.0 ml | 0.7 ml | N/A |
| Pressure at oxidizer inlet | 1012 mbar | 1030 mbar | 1030 mbar |

Runs 1 and 2 use fresh drying tubes in the place of the high efficiency water trap to collect the tritiated water produced following the oxidation reaction. Runs 3 and 4 employed a direct connection from the sample container to the process oxidizer and used recycled drying tubes that had the tritiated water liberated by a water liberation process. Runs 5-7 increased the tritiated material volume to 50 ml with run 7 further including 27 Ci of labile organic material.

Figure 4:
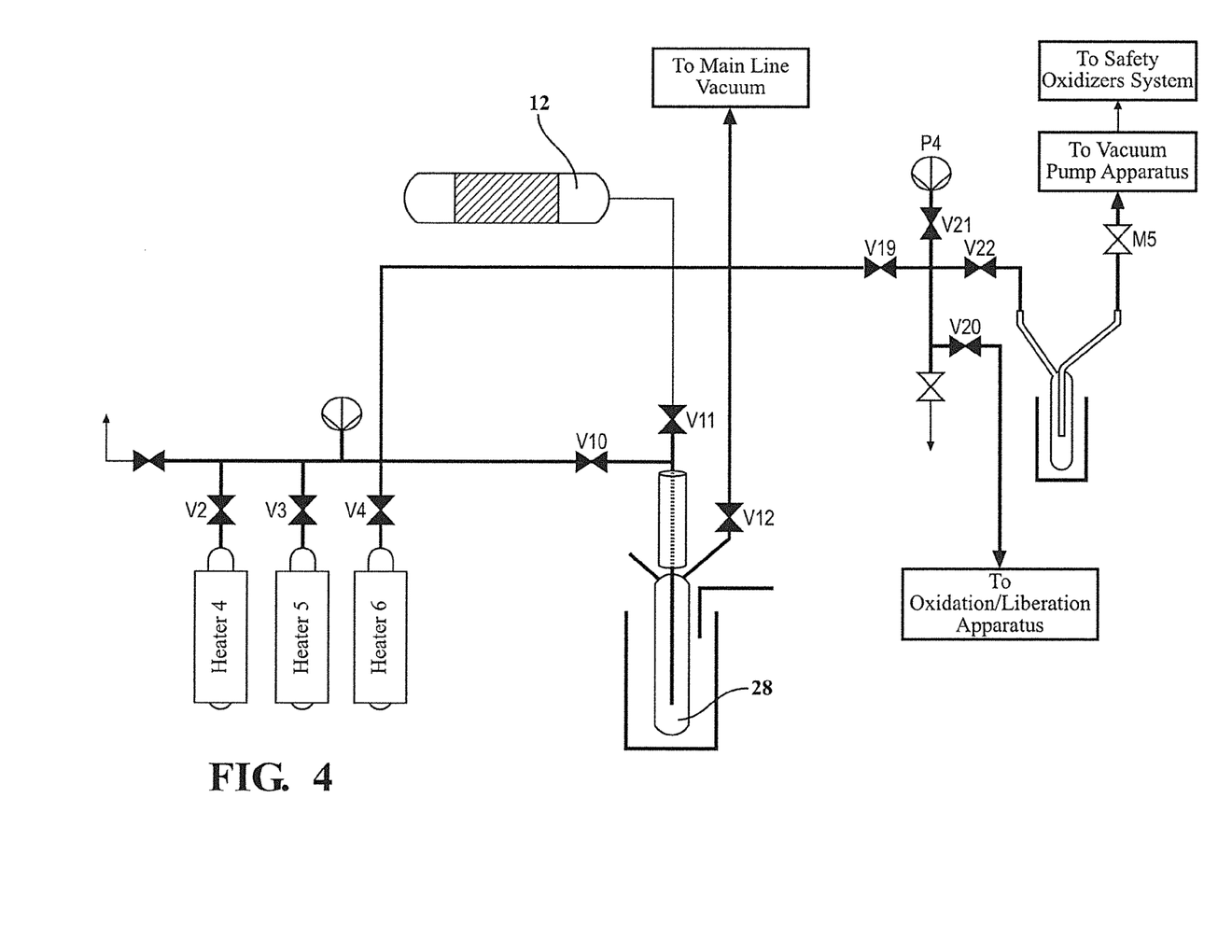
FIG. 4 illustrates a partial system of liberation of tritium focusing on a water liberation subsystem according to one aspect where ▶◀ and ⋈ represent valves.

In some aspects in which tritiated water is present in stored drying tube(s), the water is optionally liberated from the tubes by a water liberation process for use in subsequent reactions and isolation of tritium from the tritiated water. The water liberation process is performed using tritiated water containing drying tubes as a source material using the apparatus as depicted in FIG. 4. Prior to a tritiated water liberation run, the process oxidizer is turned on and allowed to come to a temperature between 490-590° C. The following parameters are checked: The air to the valves is turned on and the hood air monitoring system for tritium (Overhoff) is also checked to make sure it is properly functioning and indicates only background levels of tritium being detected. The high efficiency water trap 28 is then turned on and set at a temperature of −20° C. The Controllers 3, 4, 5 and 6 are then set at a temperature of 250° C. and the air valve is opened to the process oxidizer. Liquid nitrogen is then added to the main line trap and the vacuum pump is turned on. The vacuum line is first tested and the display will indicate "Start Vacuum Test" and is pushed by the operator. The valves V19, V20, V21 and V22 are opened and after five minutes the maximum vacuum will be achieved. Valve V22 is then closed and after five minutes the reading of P4 should be less than 0.7 psi. The statement "Leak Test Passed" will then appear on the display and a "Continue" button will also appear. The operator will push the "Continue" button.

Valves V12 and V22 are now opened. The following buttons will now appear on the display "Heater 4", "Heater 5" and "Heater 6" and the operator selects the appropriate heater to liberate from. If "Heater 4" is pushed, then valve V2 will open and Heater 4 will turn on. If "Heater 5" is pushed, then valve V3 will open and Heater 5 will turn on. If "Heater 6" is pushed, then valve V4 will open and Heater 6 will turn on. The tritiated water liberation process will take ten hours after which time the "End Liberation" button will appear on the display and is pushed by the operator. All heaters are then turned off and valves V2, V3, V4, V10, V12, V20, V21 and V22 are closed. The operator also closes M5, turns off the vacuum pump and the air to the process oxidizer. The results and parameters from 6 runs of water liberation are illustrated in Table 2:

The amount of water collected at the end of the liberation process is in excellent agreement with that expected.

The tritiated water produced from the oxidation reaction and the water liberation step is subjected to splitting to obtain tritiated gas in the form of HT or $T_2$ is exemplified in the system of FIG. 3. As a safety measure, throughout the entire tritiated water splitting run, the pressure gauge P2 106 should not exceed 15 psi and the pressure gauge P3 112 should not exceed 10 psi. If the respective pressures exceed these values, the syringe pump used to inject the tritiated water into the reaction vessel should be turned off and the program shut down. With the program started, the safety oxidizers are turned on and allowed to come to a temperature between 490-590° C. The following parameters should also be checked: The air to the valves should be turned on and the hood air monitoring system for tritium is also checked to make sure it is properly functioning and indicates only background levels of tritium being detected. The air to the safety oxidizers is then turned on. Liquid nitrogen is then added to the main line trap and the vacuum pump is turned on. Liquid nitrogen is then added to the tritium line trap as well as the charcoal tank. Valves M3 and M5 are then opened.

The vacuum line is first tested and the display will indicate "Start Vacuum Test" and is pushed by the operator. The valves V17, V19, V21 and V22 will open and after five minutes the maximum vacuum will be achieved. Valve V22 will then close and after five minutes the reading of P4 should be less than 0.7 psi. The statement "Leak Test Passed" will then appear on the display and a "Continue" button will also appear. The operator will push the "Continue" button.

Valves V17 and V19 will now close. As prompted by the display instructions, the operator will then do the following: Weigh out 60 g of magnesium and 110 g of phosphorous pentoxide and place in that order in the acid flask. Place an ice water bath under the acid flask and turn on the magnetic stirrer. Check that the syringe pump rate is set at 1 ml per minute and that the target volume is set at 40 ml. The operator will then push the "Continue" button. The syringe pump injects tritiated water at a rate of 1 ml/min into the reaction vessel.

The program will then open valve V9, start the syringe pump and carry out the following steps. Guided by the Lab View monitor when P2 106 exceeds 10 psi, valve V8 is opened. After 3 seconds, valve V14 is opened. After 60 seconds, valves V8 and V14 are closed. Valves V17 and V18 are then opened. When P3 is less than 3 psi, valves V17 and V18 are closed. This cycle is repeated again. After 90 minutes and when P2 106 is less than 5 psi, the display will show the "End Run" button. The operator pushes the "End Run" button. Finally, the operator closes the air to the Main Oxidizer, closes M3 and M5 and turns off the vacuum pump.

TABLE 2

|  | RUN # 1 | RUN # 2 | RUN # 3 | RUN # 4 | RUN #5 | RUN # 6 | RUN # 7 (Hot) |
|---|---|---|---|---|---|---|---|
| Drying tube temperature (at heater) | 250° C. | 250° C. | 250° C. | 250° C. | 250° C. | 250° C. | 250° C. |
| Process manifold pressure | 0 mbar | 0 mbar | 0 mbar | 0 mbar | 0 mbar | 0 mbar | 0 mbar |
| Water trap temperature | −180° C. | −180° C. | −180° C. | −180° C. | −180° C. | −180° C. | −180° C. |
| Actual run time | 3 hrs | 3 hrs | 3 hrs | 3 hrs | 7 hrs | 7 hrs | 7 hrs |
| Volume of water expected, assuming no losses (ml) | 7.3 | 7.3 | 7.2 | 7.2 | 46.1 | 46.1 | 46.1 |
| Volume of water collected (ml) | 6.0 | 6.2 | 5.0 | 5.9 | 41.0 | 42.0 | 45.0 |

The water reacted is 1444.4 nmol that should theoretically produce 1444.4 nmol hydrogen. In these reactions, 85% of the material introduced into the system is recovered as water to be reused. The remaining 15% represents recovered tritium resulting in a recovery of 1094.0 nmol hydrogen corresponding to a 75.7% yield.

The above process is repeated with a full scale batch of tritiated water of 2222.2 nmol. The water was injected at a rate of 2-3 ml/min. The splitting reaction is performed in a reaction vessel submerged in a water bath at a temperature of approximately 20° C. The exothermic splitting reaction will raise the temperature of 70° C. by the time the entire water sample is reacted. The hydrogen yield expected is 2222.2 nmol. The amount recovered was 1620.2 nmol for a recovery of 72.9% yield.

The hydrogen trapped in the charcoal is subjected to isolation to separate out the recovered $T_2$ from HT using the apparatus as depicted in FIG. 5. As a safety measure, throughout the entire separation process it is important to be certain that the hood scrubbers are in working order and that the hood oxidizers are at operating temperature. Also, the hood tritium monitor should be connected and functioning properly. The Dewar flask around the line trap should then be filled with liquid nitrogen and the trap allowed to cool for 15 min. The needle valve supplying air to the oxidizers is then opened and the pressure is monitored so that it does exceed 15 psi. The vacuum pump is then started and the line valves to the pump are opened. The valve to the TH manifold is then opened followed by opening the compressed air valve and the air supply valve to the solenoids. The mode of operation interface is then set to "auto" by the setting of S1 to "0" and S2 to "0" on the process automation terminal. This will remove the PAT from manual operation and prevent accidental switching of any valves. The proper keystrokes are entered to access the LabTech Control software.

To start the run, all manual valves that need to be opened are opened as well as the helium tank valve, ensuring that the tank is full at 3500 psi. The black helium valve is then turned to the bleed position for a few seconds to purge the line and then turned back. The program "T-H.LTC" is selected so that Screens 1 and 2 can be accessed. The run is started with the typed command "ALT-1." Soon thereafter, the valves will open to perform bellows pump and injection loop evacuation. The operator then presses "2" to display the second screen of the program, showing the real time configuration of the process including the valve positions and stage number. At Stage 5 the manual rotameter is checked to ensure that the flow is 30 cc/min. If there is no flow, the rotameter knob is turned. With the proper flow obtained, the sample loop is then immersed in liquid nitrogen. After 15 min. the command "ALT 2" is pressed to continue to Stage 6.

At Stage 7, M10 is opened to allow tritium gas to flow go to the sample loop. After equilibration, M10 is closed and the command "ALT 3" is pressed to continue. At Stage 9, the activity peak is observed on the first detector IG1. At Stage 11, the Dewar flask around the injection loop is lowered. After Stage 13, the operator presses "3" to view the activity plots on Screen 3 and observe the HT and $T_2$ gases eluting off the main column. The system will automatically and independently collect the HT and $T_2$ gases. After ~200 min, the operator presses "ALT 4" to collect the HT peak and after ~300 min, presses "ALT 5" to collect the $T_2$ peak. When the $T_2$ peak has been collected, the operator presses "ALT 6" to automatically shut down the system when the column pressure reaches 40 psi.

Various modifications of the present processes and apparatuses/systems, in addition to those shown and described herein, will be apparent to those skilled in the art of the above description. Such modifications are also intended to fall within the scope of the appended claims.

It is appreciated that all reagents, equipment and materials are obtainable from commercial sources known in the art unless otherwise specified.

Patents, publications, and applications mentioned in the specification are indicative of the levels of those skilled in the art to which the processes and apparatuses/systems pertains. These patents, publications, and applications are incorporated herein by reference to the same extent as if each individual patent, publication, or application was specifically and individually incorporated herein by reference.

The foregoing description is illustrative of particular aspects of the processes and apparatuses/systems, but is not meant to be a limitation upon the practice thereof. The following claims, including all equivalents thereof, are intended to define the scope of the processes and apparatuses/systems.

We claim:

1. A process of reclaiming tritium from a tritium containing byproduct stream comprising:
    oxidizing a tritium containing organic material for an oxidation time and at an oxidation temperature to produce tritiated water;
    splitting said tritiated water to a solid oxygen containing species and a tritiated gas species; and
    trapping said tritiated gas species.

2. The process of claim 1 further comprising evaporating and condensing said tritiated water to produce a purified tritiated water, and subjecting said purified tritiated water to said step of splitting.

3. The process of claim 1 wherein said step of oxidizing comprises contacting said tritium containing organic material with purified oxygen.

4. The process of claim 1 wherein said oxidation temperature is in excess of 100 degrees Celsius.

5. The process of claim 1 wherein said oxidation temperature is in excess of 300 degrees Celsius.

6. The process of claim 1 wherein said oxidation temperature is from 490 degrees Celsius to 590 degrees Celsius.

7. The process of claim 1 wherein said step of oxidizing is in the presence of a catalyst.

8. The process of claim 1 wherein said oxidation time is 7 to 14 hours.

9. The process of claim 1 wherein said oxidation time is 10 hours.

10. The process of claim 1 wherein said step of splitting comprises contacting said tritiated water with a splitting material suitable to bind oxygen as a solid by-product.

11. The process of claim 10 wherein said splitting material comprises magnesium and phosphorous pentoxide.

12. The process of claim 10 wherein said tritiated gas species comprises raw tritium gas, and wherein said step of trapping said tritiated gas species comprises trapping said raw tritium gas.

13. The process of claim 12 wherein said step of trapping comprises contacting said raw tritium gas with charcoal.

14. The process of claim 1 further comprising separating pure tritium from hydrogen in said tritiated gas species.

15. The process of claim 14 wherein said step of separating comprises:
    passing said tritium gas through a molecular sieve column and a second column, said second column comprising activated charcoal and $CO_2$.

16. The process of claim 14 wherein separating is by cryogenic gas chromatography.

17. The process of claim 14 further comprising trapping said pure tritium in uranium.

18. A process of producing a tritiated gas from a tritiated liquid water comprising:
   contacting tritiated liquid water with a splitting material suitable to bind oxygen as a solid by-product; and
   splitting said tritiated water to a solid oxygen containing species and a tritiated gas species, and trapping said tritiated gas species.

19. The process of claim 18 wherein said splitting material comprises magnesium and phosphorous pentoxide.

20. The process of claim 19 wherein said magnesium is layered below said phosphorous pentoxide relative to a tritiated water source such that said magnesium and said phosphorus pentoxide are not intermixed.

21. The process of claim 18 wherein the rate of tritiated liquid water addition to said splitting material is below the rate that will produce MgOH.

22. The process of claim 18 wherein said step of splitting is performed at a splitting temperature of 18 degrees Celsius to 26 degrees Celsius.

23. The process of claim 18 wherein said step of contacting is at an atmospheric pressure of 15 pounds per square inch or less.

24. The process of claim 18 wherein said step of splitting is actively cooled.

25. The process of claim 18 wherein said solid oxygen by-product comprises a metal salt of phosphate or sulfate.

* * * * *